J. P. SCULL.
BOTTLE BLOWING MACHINE.
APPLICATION FILED DEC. 27, 1916.

1,285,420.

Patented Nov. 19, 1918.
2 SHEETS—SHEET 1.

WITNESSES
Jesse B. O'Feller
R. A. Balderson

INVENTOR
Jas. P. Scull
by Bakewell, Byrnes Cornelius
Attys

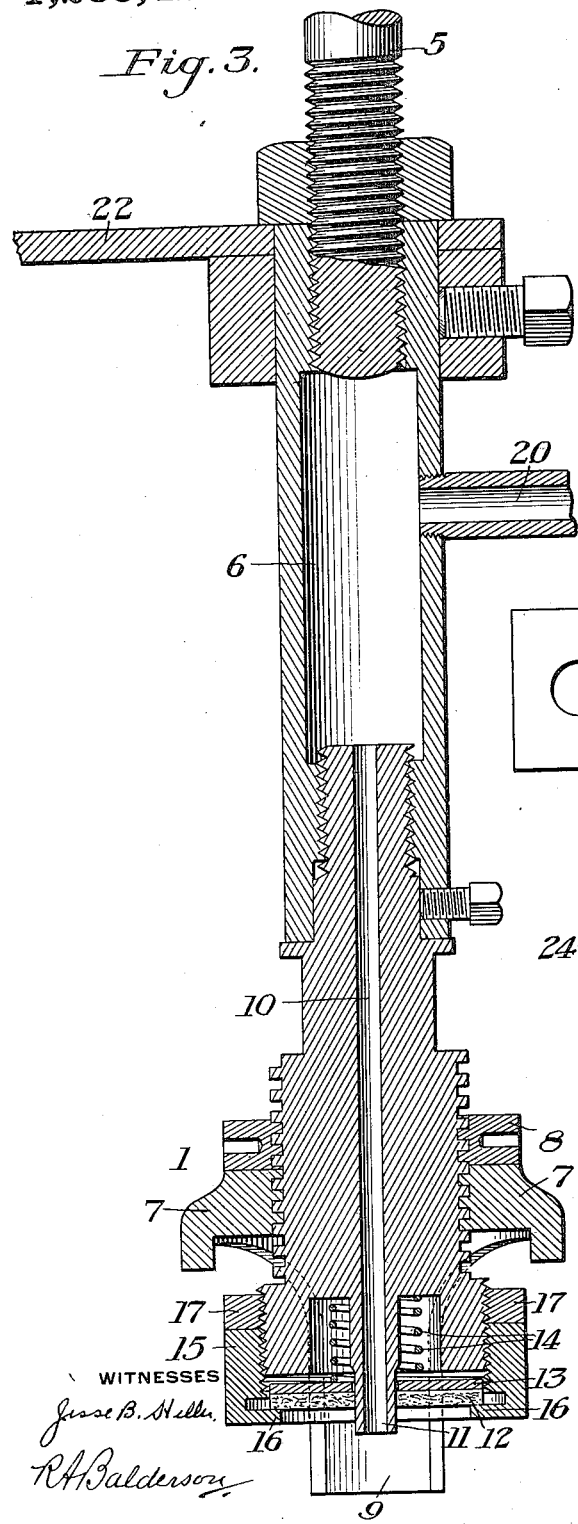
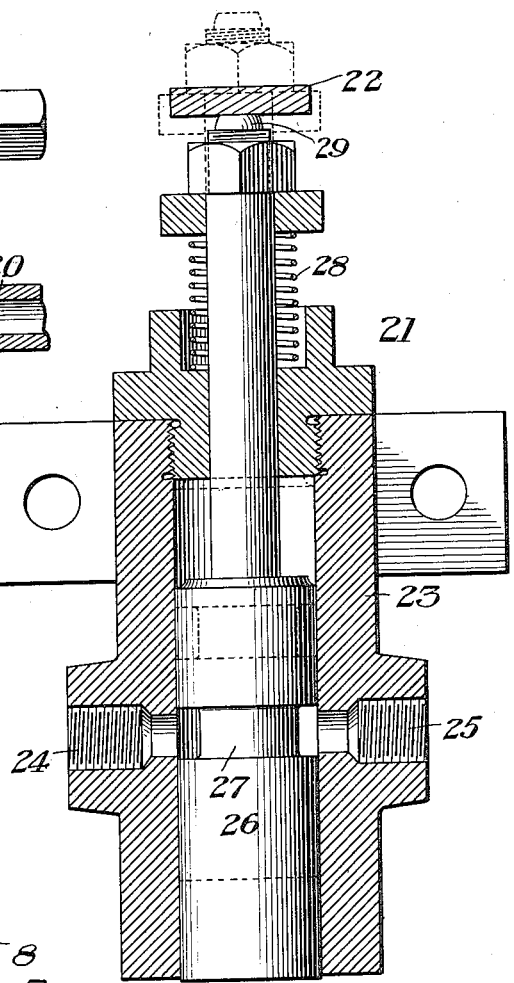

UNITED STATES PATENT OFFICE.

JAMES P. SCULL, OF MILLVILLE, NEW JERSEY, ASSIGNOR TO WHITALL-TATUM COMPANY, OF MILLVILLE, NEW JERSEY, A CORPORATION OF NEW JERSEY.

BOTTLE-BLOWING MACHINE.

1,285,420.

Specification of Letters Patent.

Patented Nov. 19, 1918.

Application filed December 27, 1916. Serial No. 139,085.

*To all whom it may concern:*

Be it known that I, JAMES P. SCULL, a citizen of the United States, and a resident of Millville, in the county of Cumberland and State of New Jersey, have invented a new and useful Improvement in Bottle-Blowing Machines, of which the following is a full, clear, and exact description, reference being had to the accompanying drawings, forming part of this specification, in which—

Fig. 3 is a vertical section through the blow head, and

Fig. 4 is a vertical section through the air valve.

The invention relates to bottle blowing machines, and particularly to an improved blow head for such machines. The object of the invention is to produce a simple blow head which will operate with minimum wear and liability of leakage, and which is readily adjustable to operate on bottles having different height of lips. The usual type of blow head for this class of machines is provided with a sliding bell which, in connection with the stem, act as a valve to admit or cut off the flow of air to the bottle to be blown. It is found that these wear comparatively rapidly and leak. The blow head of the present invention has an adjustable bell securely mounted on the stem and the blow head itself contains no valves or wearing parts to cause a leak of air. A stationary valve is mounted on the machine and is operated by the movement of the blow head to admit or cut off air thereto. The bell is made adjustable so that the blow head is adapted to blow bottles having lips of any height extending above the blow mold. A cover or washer of fibrous non-heat-conducting material is brought against the top of the bottle lip and yieldingly held against it by spring pressure so as to form a tight seal. The present invention also relates to certain other combinations and arrangements of parts particularly pointed out in the claims, the advantages of which will be apparent to those skilled in this art from the following description.

Figure 1:
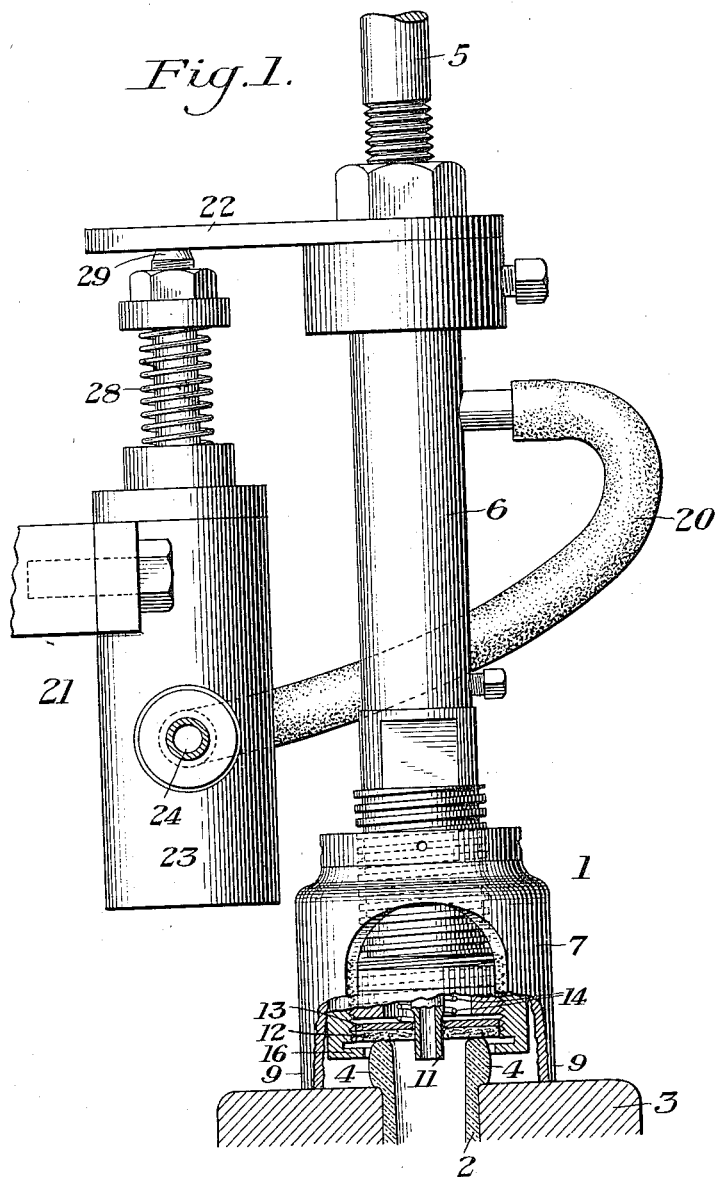
Figure 1 is a front elevation partially in section of the blow head.
Figure 2:
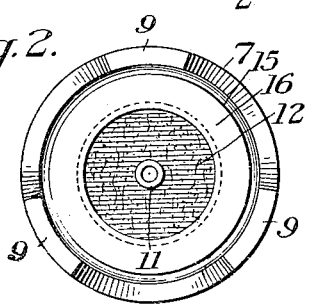
Fig. 2 is a bottom view of the blow head.

Referring to the drawings, in which the preferred embodiment of the invention is illustrated, the blow head, indicated generally by reference numeral 1, is arranged to be moved downwardly to blow a bottle blank or parison into a complete bottle in the blow mold 3. Any usual form of blow mold may be employed, as will be readily understood by those skilled in the art. In the drawings only the upper end of the blow mold 3 is indicated. In the blow mold 3 is the parison or blank 2 to be blown, the neck and lip of which is already formed. The neck and lip portion are shown in Fig. 1, the lip 4 extending above the top of the blow mold 3. The blow head is carried on the usual reciprocating blow head rod 5 which is raised and lowered usually by a compressed air cylinder and piston to blow the parison into a finished bottle, as will be understood by those skilled in this art. Secured to the rod 5 is a hollow stem 6 upon the lower end of which is adjustably mounted the bell 7 which forms a stop or abutment engaging the top of the blow mold 3. Instead of the usual cup-like air-confining bell, the sides of the bell are cut away, leaving legs 9 which engage the top of the blow mold. The bell 7 is threaded on the stem and may be turned up or down to accommodate shorter or longer lipped bottles. The bell 7 with its legs 9 forms an adjustable abutment which engages the blow mold and positions the blow head with relation thereto. A lock nut 8 is provided for locking the bell 7 in its adjusted position. The air passage 10 through the stem terminates in a projecting tube 11 which extends into the mouth of the blank to be blown. Surrounding the tube 11 is a cover or washer 12 of soft fibrous non-heat-conducting material, such as asbestos. The washer 12 is backed up with a steel washer 13 which is pressed downwardly by means of a coil spring 14. A collar 15 is threaded on the lower end of the stem and has an inwardly projecting lip 16 which engages and supports the edge of the asbestos washer 12 against the downward pressure of the spring. The collar 15 may be turned down or up to permit the washer 12 to yield more or less when it engages the lip of the bottle. A lock nut 17 serves to lock the collar 15 in its adjusted position. The air is supplied to the blow head through a flexible pipe 20. The admission of air through the pipe 20 is controlled by the air valve 21. The air valve 21 is mounted on a stationary part of the machine and is arranged to be operated by a striker arm 22 moved with the blow head. The valve 21 consists of a valve casing 23 having oppositely disposed inlet and outlet ports 24 and 25, and a reciprocating valve plunger 26 having an annular groove 27 which allows the air to pass through the valve when it registers with the ports 24 and 25. As shown in Fig. 4, the valve is open. The valve 26 is normally raised to its closed position by means of the spring 28, which is compressed by the striker 22 engaging the top of the valve stem 29 when the blow head is lowered to open the valve.

The operation of the blow head is as follows: A bottle blank or parison 2, the neck and lip of which has previously been formed, is placed in an upright position in the blow mold 3. The steps of forming the parison and its transfer to the blow mold are old in the art and need not here be described. Then the blow head 1 is brought down to blow the blank or parison into a finished bottle in the blow mold. When the blow mold is lowered the bell 7 rests on top of the blow mold 3, and the asbestos cover 12 is seated firmly on top of the lip of the bottle to form a substantially air-tight seal. The spring 14 yieldingly holds the asbestos cover so as to permit slight variations in the height of the lip. The bell 7 may be adjusted for any height of lip. The collar 13 may be adjusted to vary the tension of the spring 14 or the amount which it is compressed when the asbestos cover or washer 12 engages the lip of the blank. As the blow head nears the completion of its downward movement, the striker 22 engages the top of the valve stem 29, opening the valve 21. Upon the completion of the downward movement of the blow head, the valve 26 has been depressed against the spring 28, and the groove 27 brought into registry with the ports 24 and 25, and the air flows through the flexible pipe 20 through the air passage 10 to blow the blank. After the blank is blown into a bottle, the blow head is raised. When the blow head is raised, the striker 22 releases the valve which is immediately closed by its spring 28.

It is found that this blow head makes a perfect seal on the lip of the blank to be blown, the use of the non-heat-conducting cover or washer 12 prevents chilling of the heated glass, and the yielding of the cover 12 under the action of the spring 14 overcomes slight variations in the height of the lip. The blow head is also readily adjustable to permit blanks having any height of lip to be operated upon. There are no wearing parts in the blow head, the valve being located on the machine and operated by the movement of the blow head. This eliminates the danger of leakage which commonly occurs in the blow heads now usually employed.

While the preferred embodiment of the present invention has been specifically illustrated and described, it is to be understood that the present invention is not limited to its illustrated embodiment, but may be employed in other constructions within the scope of the following claims.

I claim:

1. A blow head for a bottle blowing machine, comprising a blow head stem, a sealing device for engaging the lip of the bottle blank, a spring shielded from the heat of the glass by the sealing device for holding the sealing device against the lip, and an abutment for engaging the blow mold adjustably mounted on the stem to provide for different height of lips; substantially as described.

2. A blow head for a bottle blowing machine, having a sealing device movably mounted in the blow head for engaging the lip of the bottle blank to be blown, and a spring for pressing the sealing device against the lip but permitting it to yield with respect to the blow head; substantially as described.

3. A blow head for a bottle blowing machine, comprising an abutment for engaging a blow mold, a cover for engaging the lip of the bottle blank, a yielding mounting for the cover permitting it to move with respect to the blow head, and a stop for the cover for limiting its movement in one direction, substantially as described.

4. A blow head for a bottle blowing machine, comprising a blow head stem having an extension entering the neck of the bottle to be blown, a sealing washer having a face of non-heat-conducting material for engaging the lip of the bottle blank and relatively movable in relation to said stem extension, a spring for yieldingly pressing the sealing washer against the lip; substantially as described.

5. A blow head for bottle blowing machines, comprising a blow head stem, a sealing device for engaging the lip of the bottle blank comprising a cover or washer of non-heat-conducting material, a spring for holding the cover yieldingly against the lip of the blank, and a collar engaging the cover for limiting its movement under the action of the spring; substantially as described.

6. A blow head for a bottle blowing machine having a sealing washer movably mounted in the blow head for engaging the lip of the bottle blank to be blown, a spring for pressing the washer against the lip but permitting it to yield with respect to the blow head, and a stop carried by the blow head engaging the washer to limit its movement under the action of the spring; substantially as described.

7. A blow head for a bottle blowing machine, comprising a sealing device for engaging the lip of the bottle blank, and a spring shielded from the heat of the glass by the sealing device for holding the sealing device against the lip to permit it to yield with respect to the blow head; substantially as described.

8. A blow head for a bottle blowing machine, comprising a sealing device movably mounted in the blow head for engaging the lip of the bottle blank, and a spring inclosed in the blow head for holding the sealing device against the lip; substantially as described.

9. A blow head for a bottle blowing machine, comprising an adjustable abutment for engaging a blow-mold, a cover for engaging the lip of a bottle blank, and a yielding mounting for the cover permitting it to move with respect to the blow head; substantially as described.

10. A blow head for a bottle blowing machine, comprising an adjustable abutment for engaging a blow-mold, a cover for engaging the lip of a bottle blank, a yielding mounting for the cover permitting it to move with respect to the blow head, and an adjustable stop for the cover for limiting its movement in one direction; substantially as described.

In testimony whereof, I have hereunto set my hand.

JAMES P. SCULL.

Witnesses:
BENJAMIN T. HEADLEY,
THOMAS WHITAKER.